(12) United States Patent
Srinivasan (10) Patent No.: US 7,721,020 B2
(45) Date of Patent: May 18, 2010

(54) METHOD AND SYSTEM FOR REDUNDANCY SUPPRESSION IN DATA TRANSMISSION OVER NETWORKS

(75) Inventor: Udayakumar Srinivasan, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 11/328,050

(22) Filed: Jan. 9, 2006

(65) Prior Publication Data

US 2007/0174668 A1 Jul. 26, 2007

(51) Int. Cl.
*G06F 13/00* (2006.01)
(52) U.S. Cl. .............................. 710/33; 710/4; 710/20; 710/34
(58) Field of Classification Search ..................... 710/4, 710/20, 33, 34
See application file for complete search history.

(56) References Cited

U.S. PATENT DOCUMENTS 6,700,871 B1 * 3/2004 Harper et al. ............... 370/235

2002/0184333 A1 * 12/2002 Appelman ................... 709/217
2005/0200871 A1 * 9/2005 Miyata ....................... 358/1.11

OTHER PUBLICATIONS

Athicha Muthitacharoen, Benjie Chen and David Mazieres, "The Low Bandwidth File System", Symposium on Operating Systems Principles, 2001.
Neil T. Spring and David Wetherall, "A protocol independent technique for eliminating redundant network traffic", Proceedings of the 2000 ACM SIGCOMM Conference, Aug. 2000, pp. 8795, Stockholm, Sweden.

* cited by examiner

*Primary Examiner*—Tariq Hafiz
*Assistant Examiner*—Jasjit S Vidwan
(74) *Attorney, Agent, or Firm*—Trellis IP Law Group, PC (57) ABSTRACT

Methods, systems and apparatus for suppressing redundancy in data transmission over networks are provided. Data segments are transmitted from a transmitting DPU to a receiving DPU. Initially, only signatures of the transmitted data segments are stored in a cache at the transmitting DPU. A data segment is stored in the cache only if it satisfies a redundancy-suppressing admission policy. Such a data segment is referred to as a redundant data segment. The redundant data segment is also stored in a cache at the receiving DPU. The transmitting DPU transmits the signatures of the redundant data segments to the receiving DPU, which then extracts the redundant data segments from its cache. Therefore, transmission of the redundant data segments is suppressed.

16 Claims, 10 Drawing Sheets

METHOD AND SYSTEM FOR REDUNDANCY SUPPRESSION IN DATA TRANSMISSION OVER NETWORKS

BACKGROUND OF THE PRESENT INVENTION

1. Field of Present Invention

Embodiments of the present invention relate, in general, to networking. More specifically, the embodiments of the present invention relate to methods and systems for redundancy suppression in data transmission over networks.

2. Description of the Background Art

In a typical network, different users often repetitively access Data Processing Units (DPUs) for data. Examples of these DPUs include computers, servers, mobile phones, and network devices. When the DPUs are accessed for the same data, this data is repetitively transmitted over the network. The repetitive transmission of the same data reduces the available bandwidth of the network. This, in turn, slows down the network's response time and affects the timely transmission of other important data. Therefore, to minimize network loading, caching often-requested data saves considerable bandwidth for transmitting other important data.

According to conventional methods, proprietary schemes are used to suppress the transmission of redundant data. Central to these schemes are data caches at the DPUs. A data cache is used to store redundant data that is transmitted repeatedly across a network. Transmitting redundant data across the network can be prevented by sending pointers to the redundant data stored in a data cache. When the data cache is full, the data cache is flushed to make room for new data. Therefore, any redundant data that is required after it has been flushed cannot be recalled from the data cache. Further, this redundant data is required to be re-transmitted across the network. Consequently, a large cache size leads to the better suppression of transmission of the redundant data. However, a large cache increases costs and may overload the processor associated with the DPU. Further, a large cache must typically be implemented on disk storage, which increases latency, thereby, making it unsuitable for high speed devices. Although the data caches implement cache replacement, they do not implement an efficient redundancy-suppressing admission policy. So they also admit non-redundant data into the data cache without scrutiny, which leads to a low utilization of the data cache and an increased processor overhead.

DESCRIPTION OF VARIOUS EMBODIMENTS

Various embodiments of the present invention provide methods, systems, and computer-readable media for suppressing redundancy in data transmission over networks. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the present invention provide a method that enables suppressing redundant data transmission over a network. Redundant data is data that is transmitted repetitively across the network. This repetitive transmission of redundant data unnecessarily consumes network bandwidth. In accordance with embodiments of the present invention, a transmitting Data Processing Unit (DPU) and a receiving DPU store redundant data; this obviates the transmission of the redundant data. Further, embodiments of the present invention optimize cache memory in the transmitting DPU and the receiving DPU in an efficient manner.

The transmitting DPU keeps a track of data that it has transmitted to the receiving DPU. For this purpose, the transmitting DPU initially stores only signatures identifying the data in a cache at the transmitting DPU. Once the data has satisfied a redundancy-suppressing admission policy (RSAP), the transmitting DPU stores the data as redundant data in its cache. Further, the transmitting DPU transmits the data with a header indicating that the data has satisfied the RSAP. On receiving the data with the header, the receiving DPU stores the data in its cache.

When the transmitting DPU has to transmit data to the receiving DPU, the transmitting DPU checks if the data is already present in the cache at the transmitting DPU. If the data is present, a label identifying the data is transmitted to the receiving DPU, instead of transmitting the data. The label can be the signature identifying the data. The label can also be an index that maps onto the signature identifying the data at the receiving DPU. Subsequently, the receiving DPU extracts the data from its cache, on the basis of the received label. The extraction of redundant data from the cache at the receiving DPU suppresses the need to re-transmit the redundant data across the network. Consequently, the use of the network bandwidth is significantly economized on.

Figure 1:
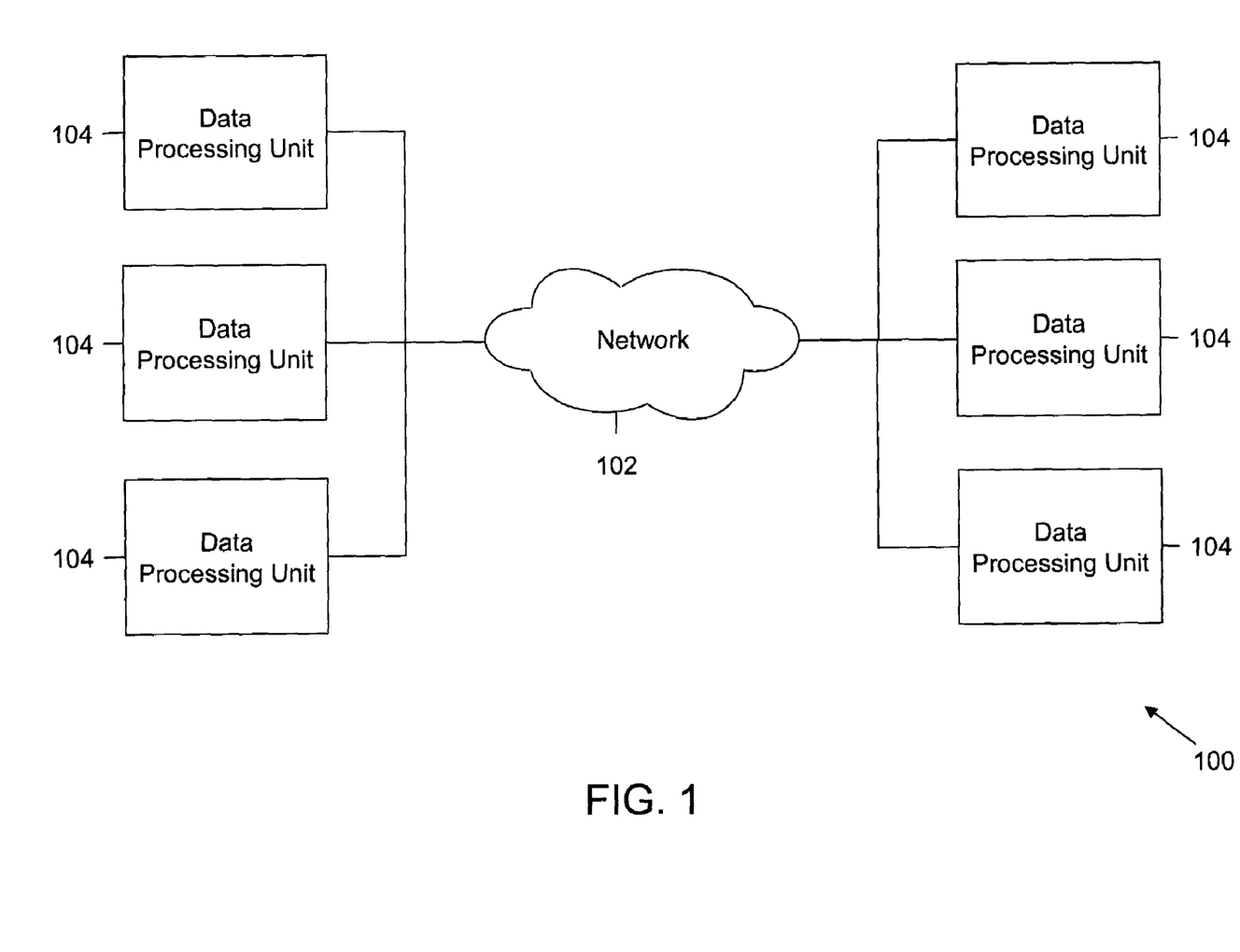
FIG. 1 illustrates a network environment for implementing various embodiments of the present invention.

Referring now to the drawings, particularly by their reference numbers, FIG. 1 illustrates a network environment 100 for implementing various embodiments of the present invention. Network environment 100 includes a network 102 and DPUs 104. It is to be understood that the specific designation for a DPU is for the convenience of the reader and is not to be construed as limiting network 102 to a specific number of DPUs 104 or to specific types of DPUs 104 present on network 102.

Examples of network 102 include Local Area Networks (LANs), Wide Area Networks (WANs), Metropolitan Area Networks (MANs), the Internet, etc. DPUs 104 may be, for example, personal computers, servers, notebooks, mobile phones, Personal Digital Assistants (PDAs) or other similar network devices. Network 102 may provide a physical or logical connection between DPUs 104. For example, network 102 can implement this connection as a private leased line, a frame-relay circuit, a Virtual Private Network (VPN) and so forth. DPUs 104 share data and services across network 102. DPUs 104 can be connected through network 102 in various network topologies. Examples of the network topologies include mesh, star, ring, and bus topologies.

Any DPU from DPUs 104 can transmit or receive data. A DPU that transmits data is hereinafter referred to as a transmitting DPU. A DPU that receives data is hereinafter referred to as a receiving DPU.

In accordance with various embodiments of the present invention, the transmitting DPU transmits data in the form of data segments. The transmitting DPU keeps a track of the data segments that have been transmitted. It initially stores only the signatures identifying the transmitted data segments, until it is established that a particular data segment is redundant. Once the particular data segment is identified as redundant, the data segment is stored as a redundant data segment at the transmitting DPU and the receiving DPU.

When the transmitting DPU has to transmit a data segment to the receiving DPU, the transmitting DPU checks if the data segment is present in the redundant data segments stored at the transmitting DPU. If the data segment is found to be present in the stored redundant data segments, the transmitting DPU transmits the signature identifying the data segment. Further, the receiving DPU extracts the data segment from the data segments stored at the receiving DPU on the basis of the received signature. In this way, the transmission of redundant data segments is suppressed.

Figure 2:
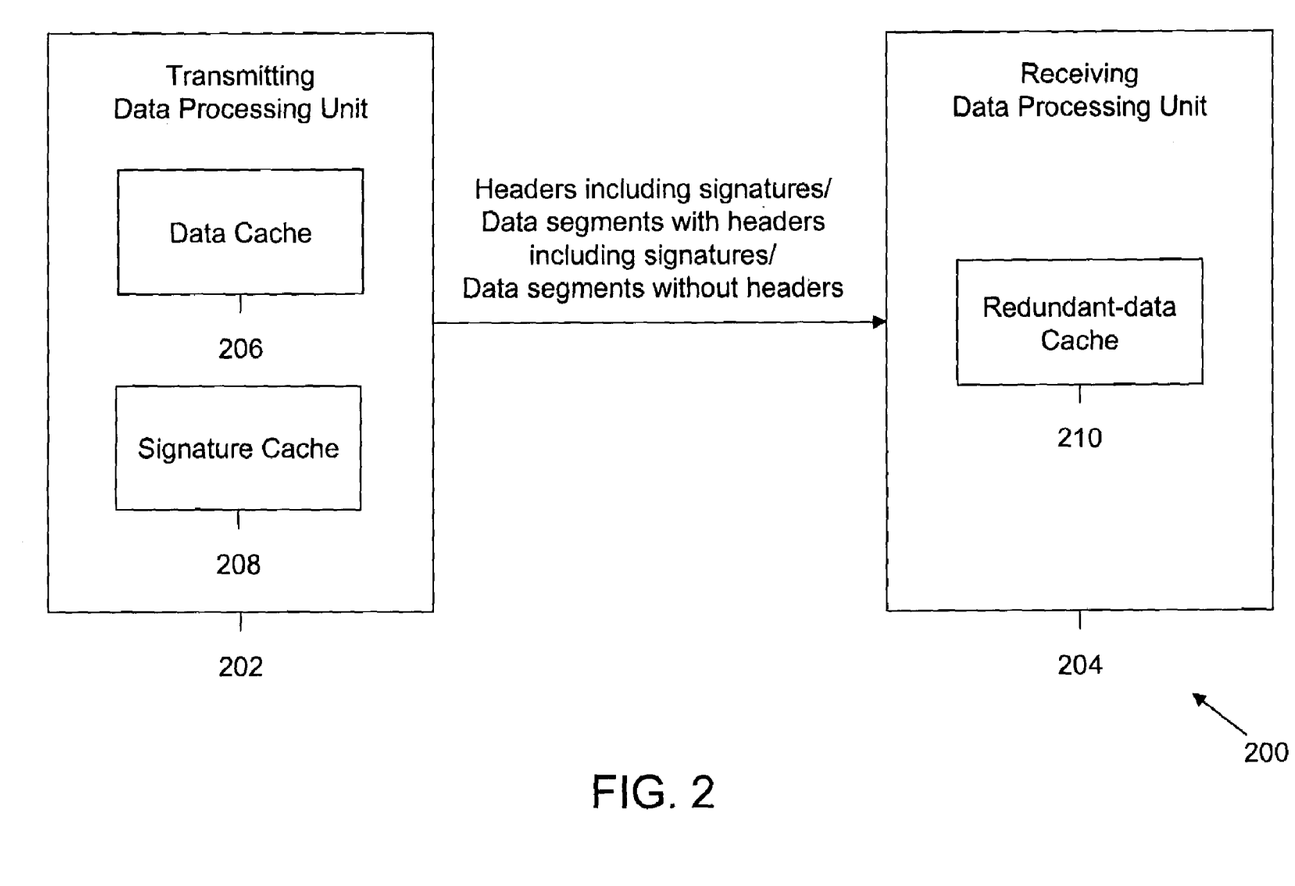
FIG. 2 illustrates various elements of a system for suppressing redundancy in data transmission over a network, in accordance with various embodiments of the present invention.

FIG. 2 illustrates various elements of a system 200 for suppressing redundancy in data transmission over network 102, in accordance with various embodiments of the present invention. System 200 includes a transmitting DPU 202 and a receiving DPU 204.

Transmitting DPU 202 includes a data cache 206 to store redundant data segments. In accordance with various embodiments of the present invention, data cache 206 stores the redundant data segments along with their signatures. Transmitting DPU 202 also includes a signature cache 208 to store signatures identifying non-redundant data segments. In accordance with various embodiments of the present invention, data cache 206 and signature cache 208 are included in a cache memory at transmitting DPU 202.

Transmitting DPU 202 compares a data segment with the redundant data segments stored in data cache 206, before transmitting the data segment to receiving DPU 204. If the data segment is present in data cache 206, transmitting DPU 202 transmits a first header that includes the signature identifying the data segment to receiving DPU 204. The first header indicates to receiving DPU 204 that the data segment is redundant and is present in a redundant-data cache 210 included in receiving DPU 204. Following this, receiving DPU 204 extracts the data segment from redundant-data cache 210 on the basis of the received signature. In accordance with various embodiments of the present invention, redundant-data cache 210 is included in a cache memory at receiving DPU 204. The cache memories at transmitting DPU 202 and receiving DPU 204 may be, for example, memory devices, hard disks, flash memories, etc If the data segment is not present in data cache 206, transmitting DPU 202 compares the signature identifying the data segment with the signatures stored in signature cache 208. If the signature is present in signature cache 208, transmitting DPU 202 checks if the RSAP is satisfied. If it is found that the RSAP is satisfied, transmitting DPU 202 transmits the data segment with a second header that includes the signature of the data segment. Further, transmitting DPU 202 stores the data segment as a redundant data segment in data cache 206, and removes the signature identifying the data segment from signature cache 208. When receiving DPU 204 receives the data segment with the second header that includes the signature of the data segment, receiving DPU 204 stores the data segment in redundant-data cache 210.

If the RSAP is not satisfied, transmitting DPU 202 transmits the data segment to receiving DPU 204. Further, transmitting DPU 202 updates information corresponding to the signature in signature cache 208. The information includes the number of times the data segment has been transmitted, in accordance with an embodiment of the present invention. The information can include the last time when the data segment was transmitted. The information can include the frequency of transmission of the data segment.

If the signature is not present in signature cache 208, transmitting DPU 202 transmits the data segment to receiving DPU 204. Further, transmitting DPU 202 stores the signature along with the corresponding information in signature cache 208.

In accordance with various embodiments of the present invention, the RSAP is satisfied when the data segment has been transmitted for a maximum number of times. A user or a network administrator defines the maximum number of times for which the data segment can be transmitted before being identified as a redundant data segment. In another embodiment of the present invention, the maximum number of times is system-defined and variable. Therefore, it can accordingly be tuned, to optimize the suppression of redundant transmission of data segments. In accordance with an embodiment of the present invention, the RSAP is satisfied when the data segment has been re-transmitted within a predefined time period. This predefined time period can be either user-defined or system-defined. In accordance with an embodiment of the present invention, the RSAP is satisfied when the frequency of transmission of the data segment equals a predefined frequency. This predefined frequency can be either user-defined or system-defined. Further, the RSAP can be dependent on other statistical data. In accordance with various embodiments of the present invention, the RSAP is dependent on the size of the data to be transmitted.

The RSAP is applied to the data segments, however, it is required that a data segment is identified even when the data repeats in different byte alignments. For this purpose, transmitting DPU 202 divides the data into data segments by using a rolling checksum algorithm, such as the Rabin's fingerprint method. This division ensures that the same data segments will be identified even if the data repeats in different byte alignments. Therefore, the RSAP works even when the data repeats in different byte alignments.

Further, the segment size can be adapted to the requirements of the data transmission. For example, particular data can be initially divided into data segments of size 1500 bytes. The percentage of redundancy suppression is checked for this segment size. This percentage can vary based on the part of the particular data that is repetitive. Further, if it is found that dividing the particular data into smaller data segments can increase the percent of redundancy suppression, the segment size is changed to a smaller size, say 512 bytes. Alternatively, the segment size can be increased. In this way, the percentage of redundancy suppression is optimized. Further, determining the optimal segment size or range of sizes can be made adaptive or self-learning.

Once the data to be transmitted is divided into the data segments, transmitting DPU 202 assigns signatures to the data segments. These signatures mark the boundaries of the data segments, and identify the data segments uniquely. The size of the signatures is small compared to the size of the data segments they identify. Therefore, the transmission of signatures of redundant data segments, instead of the actual data segments, saves the network bandwidth.

The signatures can be generated using one of the following: Secure Hash Algorithm 1 (SHA1) hash function, Message-Digest Algorithm 5 (MD5) hash function, or similar methods of generating unique signatures. A hash function is an algorithm, used for summarizing or identifying a data segment.

Further, transmitting DPU 202 can maintain a look-up table for reference. The look-up table includes the signatures corresponding to the stored redundant data segments along with the addresses of the corresponding redundant data segments in data cache 206. The signatures are used to uniquely identify the corresponding redundant data segments. For example, when transmitting DPU 202 has to check if the data segment is present in data cache 206, it checks if the signature identifying the data segment is present in the look-up table. A similar look-up table can be maintained at receiving DPU 204, to map the signatures to their corresponding redundant data segments in redundant-data cache 210. For example, when receiving DPU 204 receives a first header that includes a signature, it uniquely identifies a corresponding redundant data segment on the basis of the received signature.

In accordance with an embodiment of the present invention, only the signatures are initially stored at transmitting DPU 202 as per the RSAP. Further, when it is established that a particular data segment is redundant and can be used for redundancy suppression, the data segment is stored in data cache 206 and redundant-data cache 210.

Figure 3:
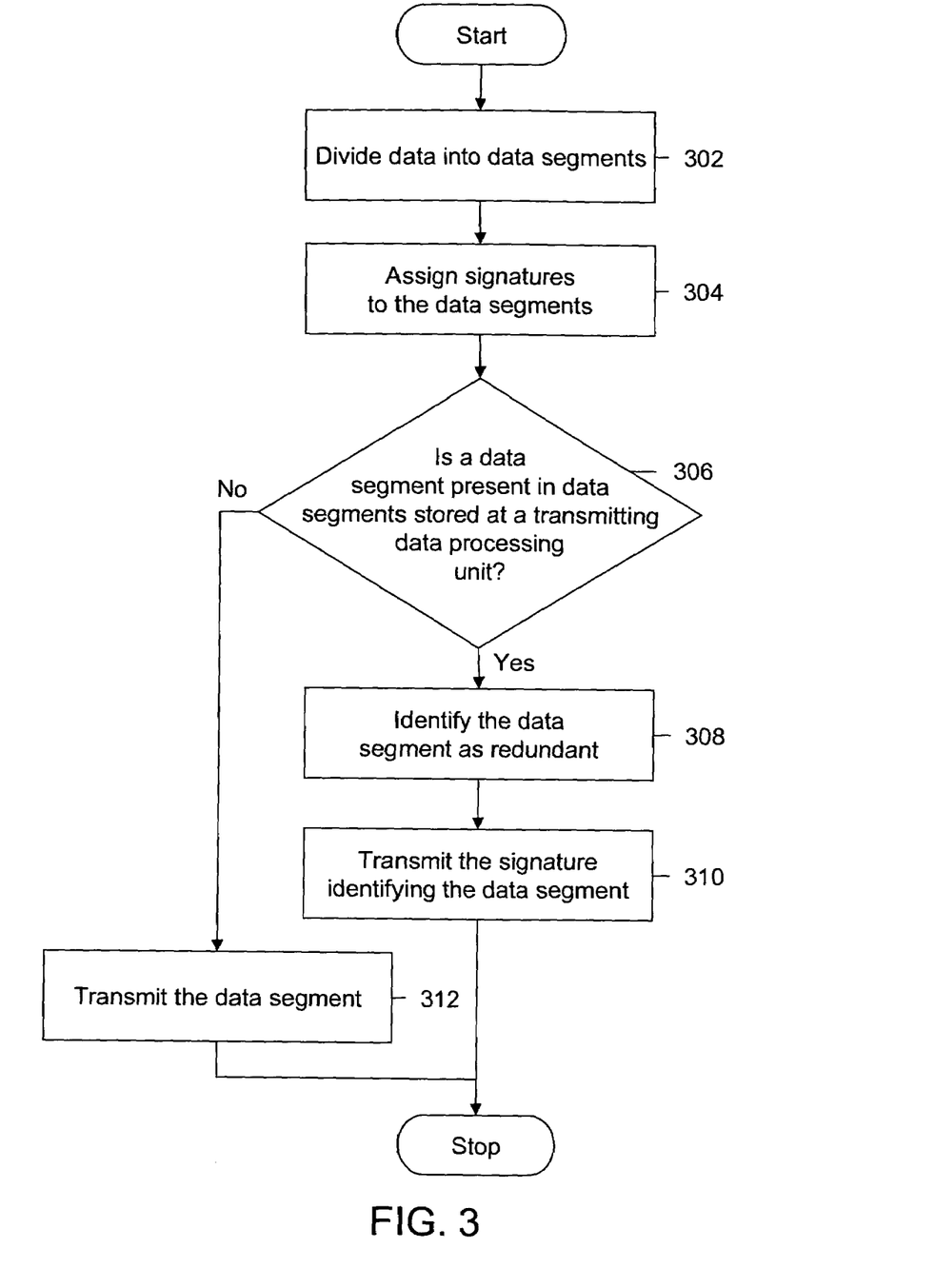
FIG. 3 is a flowchart, illustrating a method for suppressing redundancy in data transmission over the network, in accordance with an embodiment of the present invention.

FIG. 3 is a flowchart, illustrating a method for suppressing redundancy in data transmission over network 102, in accordance with an embodiment of the present invention. At step 302, transmitting DPU 202 divides data to be transmitted into data segments. At step 304, transmitting DPU 202 assigns signatures to the data segments. Further, transmitting DPU 202 performs step 306 for each data segment. At step 306, transmitting DPU 202 checks if a data segment is present in the redundant data segments stored in data cache 206. If it is found that the data segment is present in data cache 206, step 308 is performed. At step 308, transmitting DPU 202 identifies the data segment as redundant. Thereafter, at step 310, transmitting DPU 202 transmits the signature identifying the data segment to receiving DPU 204. If, at step 306, it is found that the data segment is not present in data cache 206, step 312 is performed. At step 312, transmitting DPU 202 transmits the data segment to receiving DPU 204. Detailed description of steps 306 to 310 is provided with reference to FIGS. 4A and 4B, 5, 6 and 7.

Figure 4A:
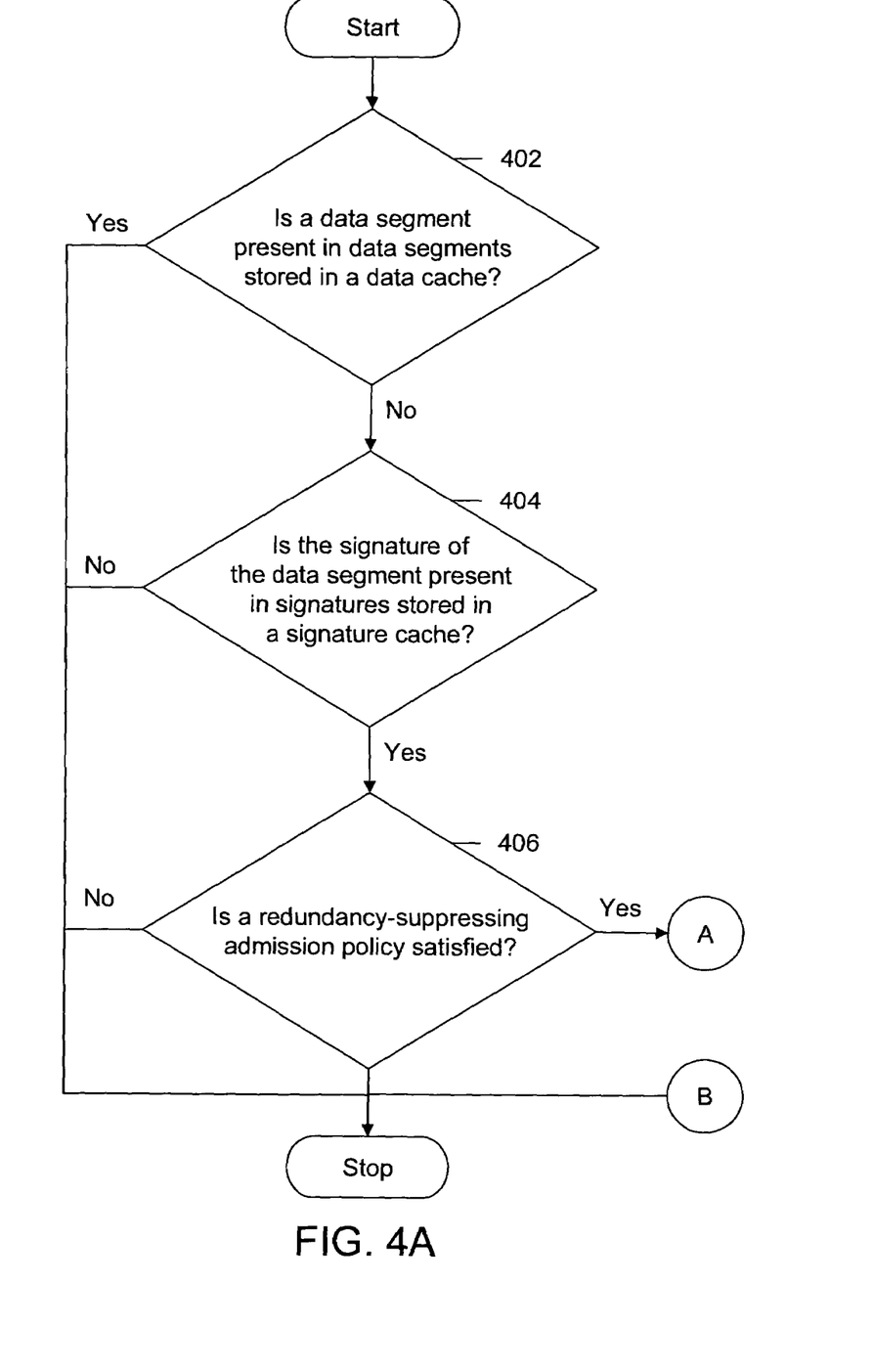
FIGS. 4A and 4B are flowcharts, illustrating a method for suppressing redundancy in data transmission over the network, in accordance with an embodiment of the present invention.
Figure 4B:
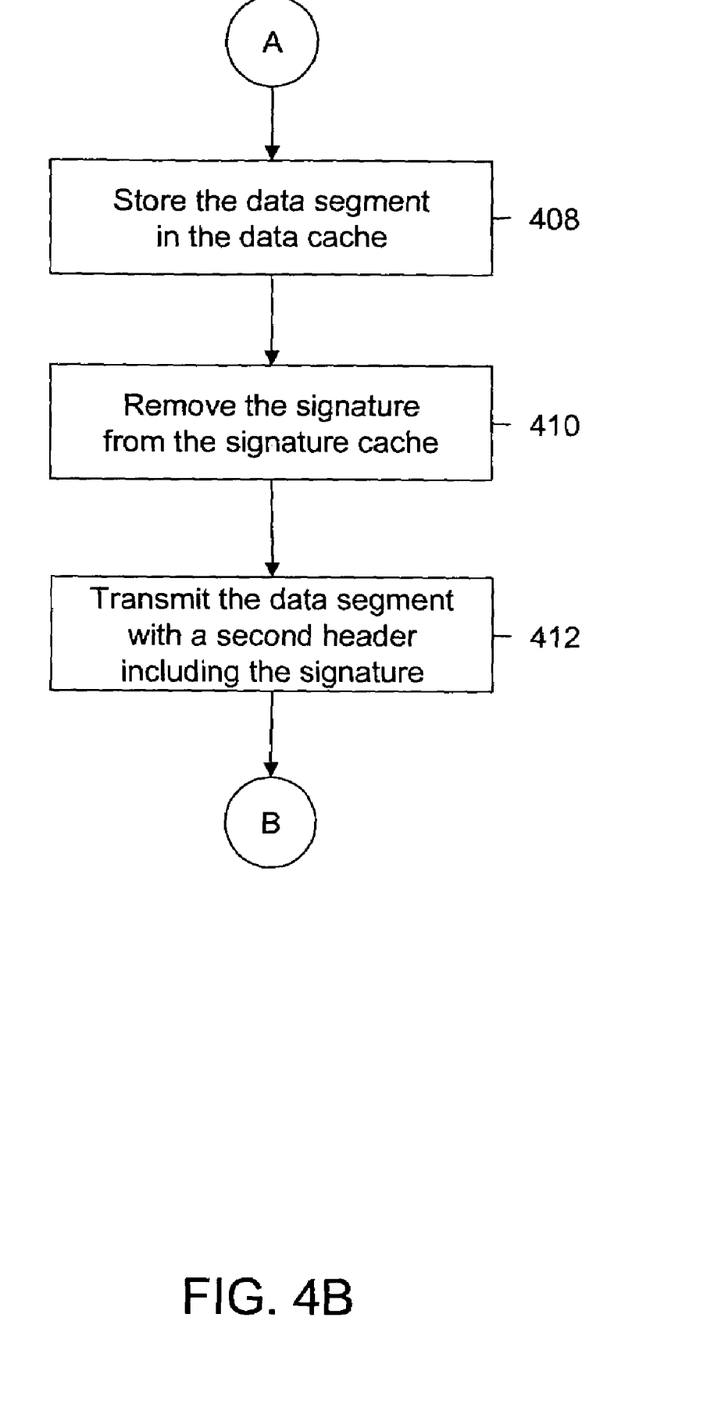

FIGS. 4A and 4B are flowcharts, illustrating a method for suppressing redundancy in data transmission over network 102, in accordance with an embodiment of the present invention. At step 402, transmitting DPU 202 checks if a data segment to be transmitted is present in the redundant data segments stored in data cache 206. If it is found that the data segment is not present in the stored redundant data segments, step 404 is performed. At step 404, transmitting DPU 202 checks if the signature identifying the data segment is present in the signatures stored in signature cache 208. If it is found that the signature is present in the stored signatures, step 406 is performed. At step 406, transmitting DPU 202 checks if the RSAP is satisfied. If it is found that the RSAP is satisfied, step 408 is performed. At step 408, transmitting DPU 202 stores the data segment in data cache 206. At step 410, transmitting DPU 202 removes the signature from signature cache 208. Thereafter, at step 412, transmitting DPU 202 transmits the data segment with a second header that includes the signature of the data segment to receiving DPU 204.

Figure 5:
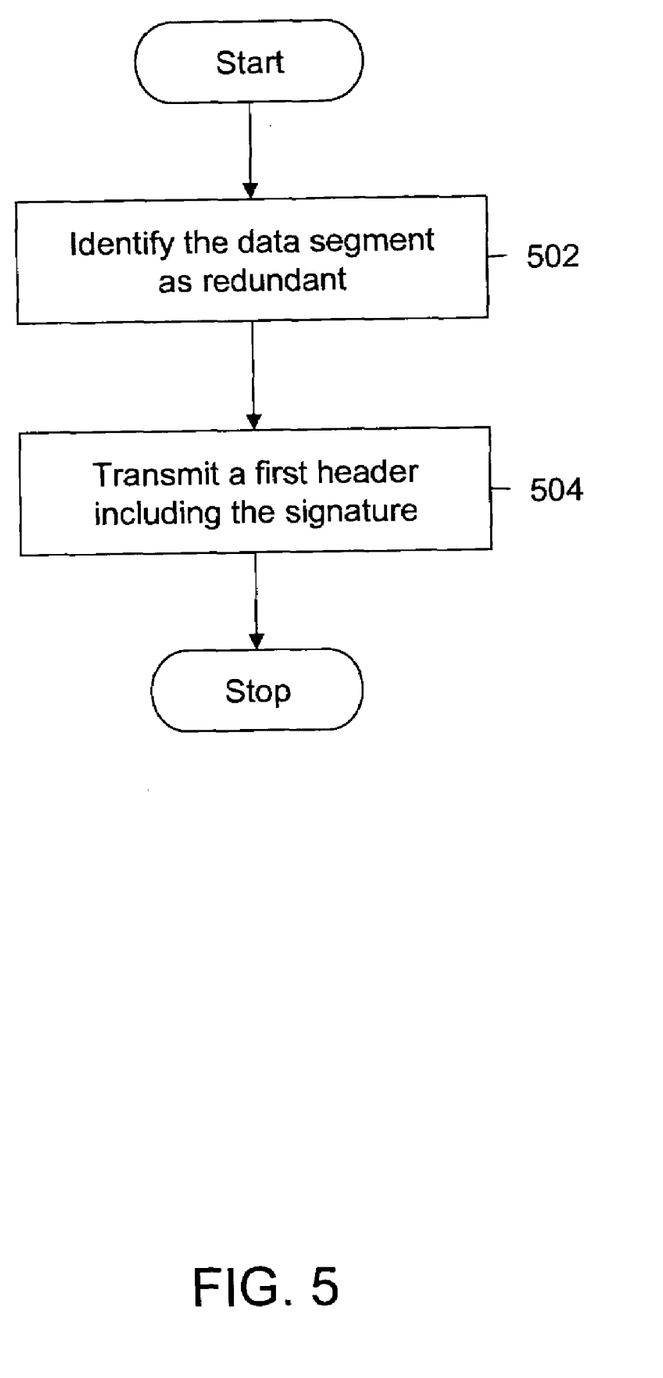
FIG. 5 is a flowchart, illustrating a method for transmitting a signature identifying a redundant data segment, in accordance with an embodiment of the present invention.

FIG. 5 is a flowchart, illustrating a method for transmitting the signature identifying the data segment, in accordance with an embodiment of the present invention. At step 402 of FIG. 4, if it is found that the data segment is present in the stored redundant data segments, the signature is transmitted as described further. At step 502, transmitting DPU 202 identifies the data segment as redundant. Thereafter, at step 504, transmitting DPU 202 transmits a first header that includes the signature identifying the data segment to receiving DPU 204.

Figure 6:
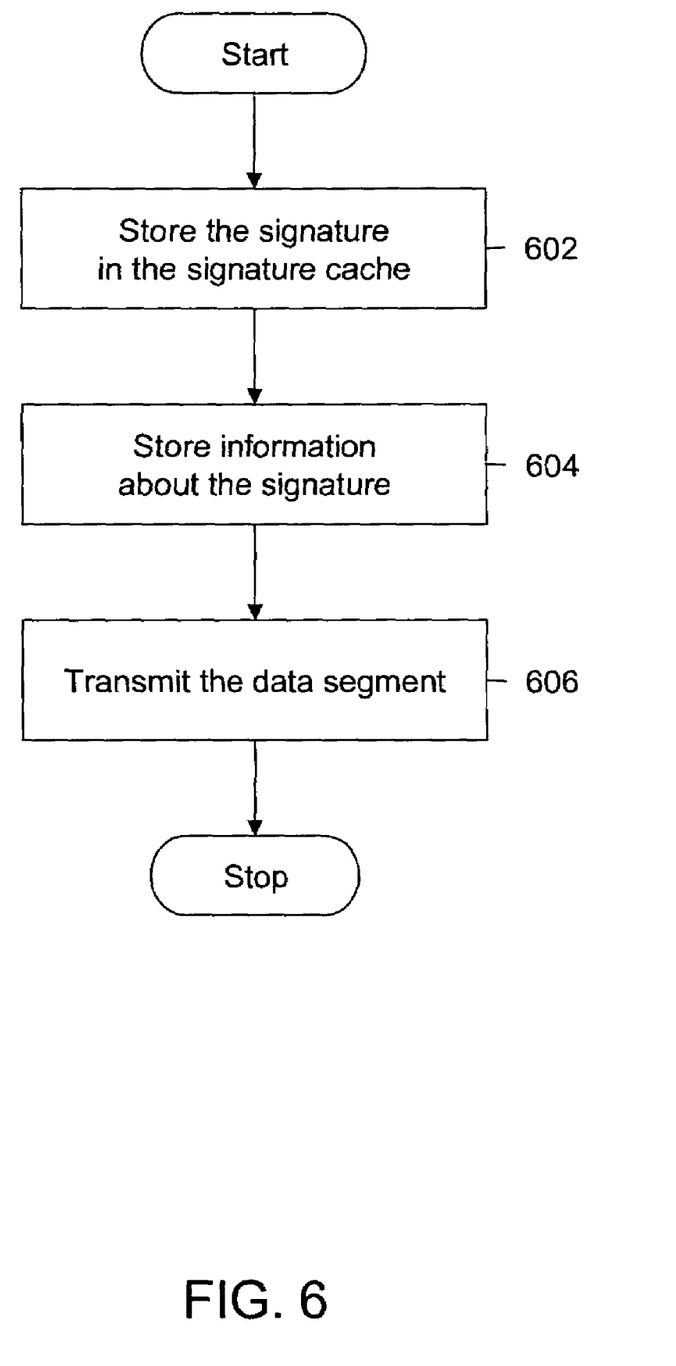
FIG. 6 is a flowchart, illustrating a method for transmitting a non-redundant data segment, in accordance with an embodiment of the present invention.

FIG. 6 is a flowchart, illustrating a method for transmitting the data segment, in accordance with an embodiment of the present invention. At step 404 of FIG. 4, if it is found that the signature is not present in the stored signatures, the data segment is transmitted as described further. At step 602, transmitting DPU 202 stores the signature in signature cache 208. At step 604, transmitting DPU 202 stores the information corresponding to the signature in signature cache 208. Thereafter, at step 606, transmitting DPU 202 transmits the data segment to receiving DPU 204.

Figure 7:
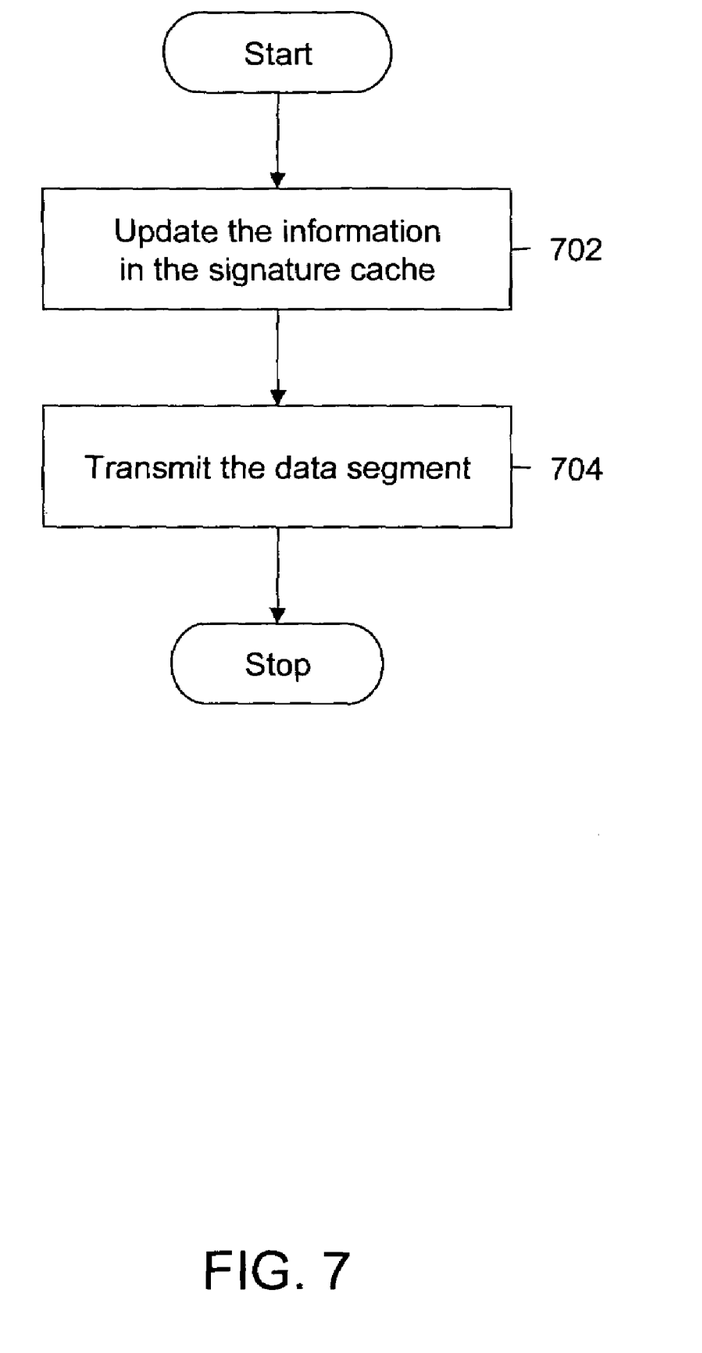
FIG. 7 is a flowchart, illustrating a method for transmitting a non-redundant data segment, in accordance with an embodiment of the present invention.

FIG. 7 is a flowchart, illustrating a method for transmitting the data segment, in accordance with an embodiment of the present invention. At step 406 of FIG. 4, if it is found that the RSAP is not satisfied, the data segment is transmitted as described further. At step 702, transmitting DPU 202 updates the information corresponding to the signature in signature cache 208. Thereafter, at step 704, transmitting DPU 202 transmits the data segment to receiving DPU 204.

In this way, transmission of redundant data segments is suppressed. Since the RSAP is uniform across DPUs 104, transmitting DPU 202 identifies the redundant data segments on the basis of the RSAP. Accordingly, transmitting DPU 202 transmits only the signatures of the redundant data segments to receiving DPU 204. Further, receiving DPU 204 reconstructs data, on the basis of the received non-redundant data segments and the received signatures of the redundant data segments.

Figure 8A:
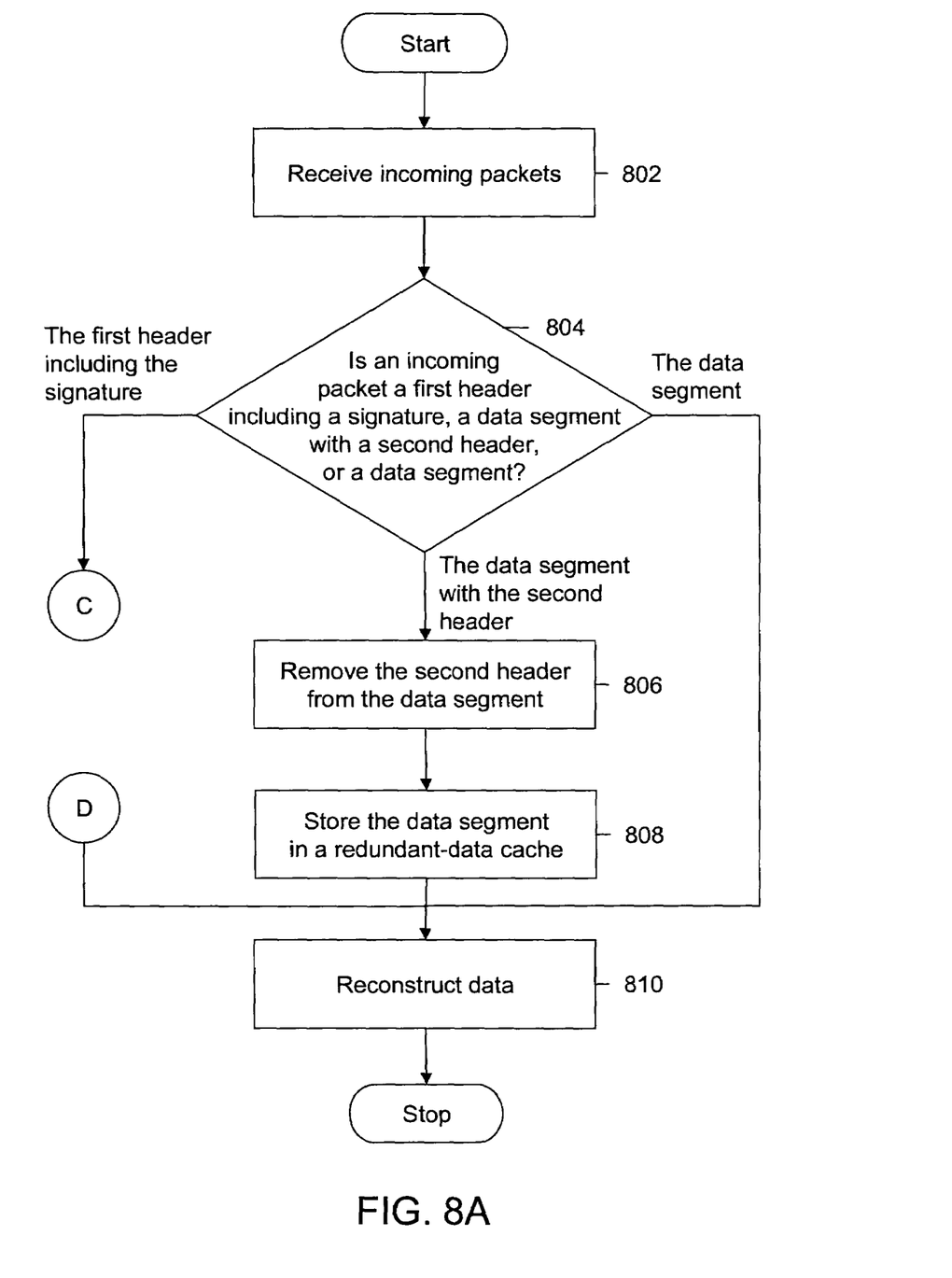
FIGS. 8A and 8B are flowcharts, illustrating a method for reconstructing data, in accordance with an embodiment of the present invention.
Figure 8B:
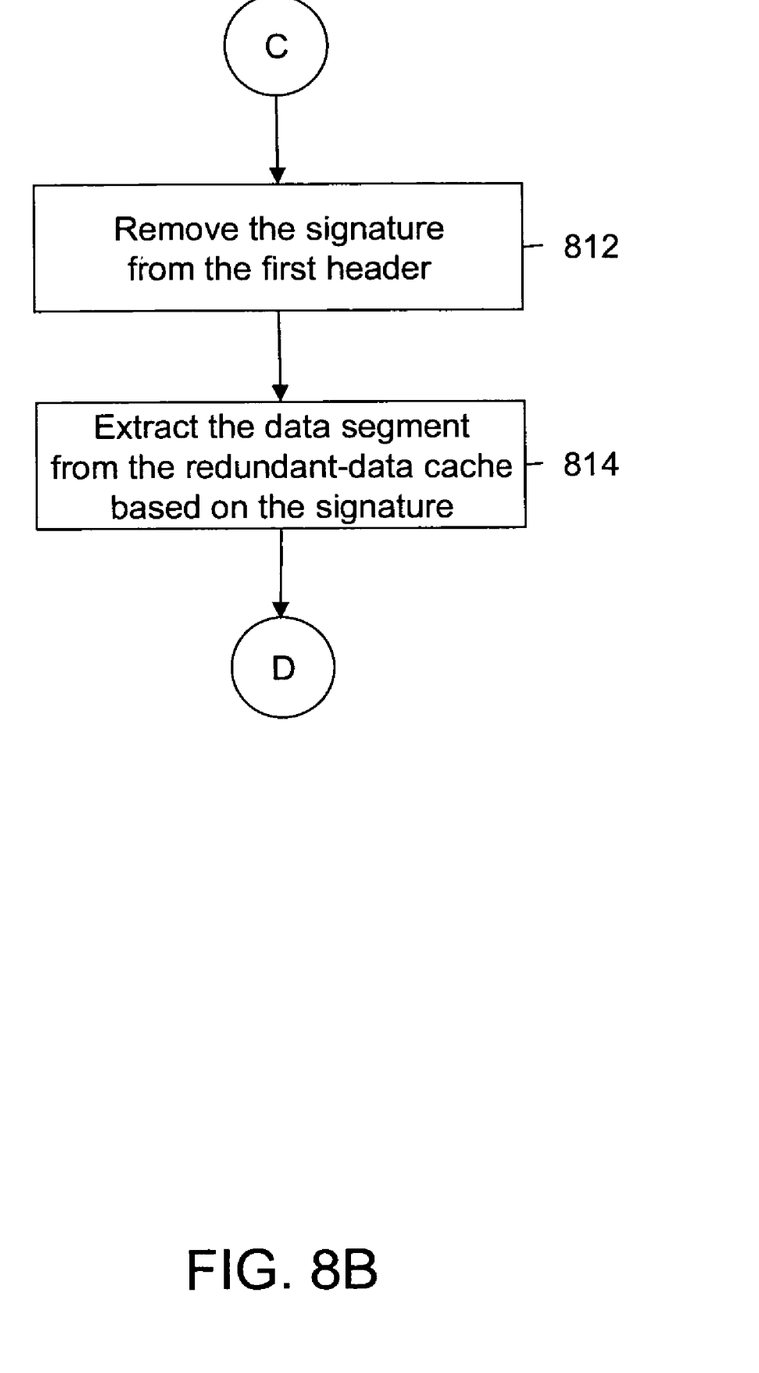

FIGS. 8A and 8B are flowcharts, illustrating a method for reconstructing data, in accordance with an embodiment of the present invention. At step 802, receiving DPU 204 receives incoming packets. These incoming packets can include first headers that include signatures, data segments with second headers that include the corresponding signatures, and data segments without any headers. Further, receiving DPU 204 performs step 804 for each incoming packet.

At step 804, receiving DPU 204 checks if an incoming packet is a first header that includes a signature, a data segment with a second header that includes the corresponding signature, or a data segment without any header. If it is found that the incoming packet is the data segment with the second header, step 806 is performed. At step 806, receiving DPU 204 removes the second header from the data segment. Thereafter, at step 808, receiving DPU 204 stores the data segment as redundant in redundant-data cache 210.

If, at step 804, it is found that the incoming packet is the first header that includes the signature, step 812 is performed. At step 812, receiving DPU 204 removes the signature from the first header. Since the signature uniquely identifies the data segment, receiving DPU 204 is capable of extracting the data segment. At step 814, receiving DPU 204 extracts the data segment from redundant-data cache 210, on the basis of the removed signature.

If, at step 804, it is found that the incoming packet is the data segment without any headers, step 810 is performed. At step 810, receiving DPU 204 reconstructs the data. In accordance with various embodiments of the present invention, receiving DPU 204 reconstructs the data from the extracted data segments and the received data segments.

In an embodiment of the present invention, before transmission, the signatures are mapped to indices that are smaller in size than the corresponding signatures. For example, the size of an MD5 hash is 16 bytes. This MD5 hash can be mapped to an index of size 4 bytes. Consequently, when transmitting DPU 202 transmits a data segment that has satisfied the RSAP, it transmits the data segment with a second header that includes an index that maps onto the signature identifying the data segment. Further, receiving DPU 204 stores the data segment with the index.

Further, when a data segment is redundant, transmitting DPU 202 transmits a first header that includes an index that maps onto the signature identifying the data segment. Thereafter, receiving DPU 204 extracts the redundant data segment on the basis of the received index. Transmitting the index, instead of the signature, saves the network bandwidth. In addition, the space allocated to redundant-data cache 210 is also saved.

In accordance with various embodiments of the present invention, a system for suppressing redundancy in data transmission over a network includes a means for identifying a data segment to be transmitted as redundant; a means for transmitting a label identifying a redundant data segment; and a means for transmitting a non-redundant data segment.

In accordance with various embodiments of the present invention, a system for suppressing redundancy in data transmission over a network includes a means for extracting a redundant data segment; and a means for reconstructing data.

According to an embodiment of the present invention, a method for suppressing redundancy in data transmission over a network is provided. The method comprises identifying a data segment to be transmitted as redundant, if the data segment is present in data segments stored at a transmitting DPU, wherein data segments satisfying a redundancy-suppressing admission policy are stored at the transmitting DPU; transmitting a label identifying the data segment, if the data segment is identified as redundant; and transmitting the data segment, if the data segment is identified as non-redundant.

Various embodiments of the present invention provide an apparatus for suppressing redundancy in data transmission over a network. The apparatus comprises a processor for executing instructions; and a machine-readable medium that includes instructions executable by the processor for suppressing redundancy in data transmission over a network. The instructions enable the apparatus to identify a data segment to be transmitted as redundant, if the data segment is present in data segments stored at a transmitting DPU, wherein data segments satisfying a redundancy-suppressing admission policy are stored at the transmitting DPU; transmit a label identifying the data segment, if the data segment is identified as redundant; and transmit the data segment, if the data segment is identified as non-redundant.

Various embodiments of the present invention provide an apparatus for suppressing redundancy in data transmission over a network. The apparatus comprises a processor for executing instructions; and a machine-readable medium that includes instructions executable by the processor for suppressing redundancy in data transmission over a network. The instructions enable the apparatus to extract a first data segment from a redundant-data cache at a receiving DPU, if a first header comprising a label identifying the first data segment is received, wherein the first header indicates that the first data segment is redundant and is present in the redundant-data cache, the first data segment is extracted from the redundant-data cache on the basis of the label; reconstruct data on the basis of the extraction; and store a second data segment in the redundant-data cache, if a second header comprising a label identifying the second data segment is received with the second data segment, wherein the second header indicates that the second data segment has satisfied a redundancy-suppressing admission policy, wherein the second data segment is stored in the redundant-data cache with the label.

Embodiments of the present invention facilitate suppression of redundant data transmission. According to embodiments of the present invention, initially, only the signatures identifying the transmitted data segments are stored. Transmitting DPU 202 tracks the number of times a data segment is transmitted over network 102, and accordingly, identifies redundant data segments. Once identified, the redundant data segments are stored in data cache 206 and redundant-data cache 210. Consider, for example, a WAN, where large data A is transmitted from one end of the WAN link to another. Embodiments of the present invention store only signatures identifying the data segments of the large data A in signature cache 208. If the large data A is requested repeatedly, it satisfies the RSAP. Subsequently, the data segments of the large data A are stored in data cache 206 and redundant-data cache 210. However, if the large data A is not requested repeatedly, it does not satisfy the RSAP and is not stored in data cache 206 and redundant-data cache 210. In this way, data cache 206 and redundant-data cache 210 are not filled unnecessarily with non-redundant data that is large. Therefore, embodiments of the present invention use data cache 206 and redundant-data cache 210 optimally for suppression of transmission of redundant data.

Since data cache 206 and redundant-data cache 210 are optimally used by storing only the redundant data segments, more time is taken to completely fill up the allocated space. Therefore, redundant data segments are stored in data cache 206 and redundant-data cache 210 for more time, before they are flushed. This is helpful in cases where a particular data segment that satisfies the RSAP is required to be transmitted after a large time gap. Consider, for example, that all the transmitted data segments, inclusive of the non-redundant data segments, are stored in data cache 206 and redundant-data cache 210. At time zero, data cache 206 and redundant-data cache 210 have data segments of data B stored in it. The allocated space is completely full in X minutes and therefore, the stored data segments are flushed. If the data B is required again after X minutes, transmitting DPU 202 has to re-transmit the data segments of the data B. Now, if the RSAP provided by various embodiments of the present invention is used, only redundant data segments are stored in data cache 206 and redundant-data cache 210. Consequently, the allocated space is completely full in more than X minutes. Therefore, the redundant data segments are stored for comparatively more time. This, in turn, improves the effective bandwidth of network 102.

Since only the redundant data segments are stored in data cache 206 and redundant-data cache 210, there is no unnecessary burden of managing the non-redundant data segments on the Central Processing Unit (CPU) of transmitting DPU 202. Therefore, the CPU performance of transmitting DPU 202 is also improved.

Although the present invention has been discussed with respect to specific embodiments thereof, these embodiments are merely illustrative, and not restrictive, of the present invention. For example, a 'method for suppressing redundancy in data transmission over a network' can include any type of analysis, manual or automatic, to anticipate the needs of the network.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the present invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the present invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. A method for suppressing redundancy in data transmission over a network, the method comprising:
    storing redundant data segments and corresponding signatures in a data cache of a transmitting data processing unit (DPU);
    storing signatures identifying non-redundant data segments in a signature cache of the transmitting DPU, wherein the signature cache is separate from the data cache;
    identifying if a data segment to be transmitted to a receiving DPU is redundant, wherein the data segment is redundant if the data segment is present in the data cache or if the data signature satisfies a redundancy-suppressing admission policy, wherein the data segment satisfies the redundancy-suppressing admission policy if the given data segment has been transmitted for a predefined maximum number of times;
    transmitting a label identifying the data segment to the receiving DPU while omitting the data segment from the transmitting, if the data segment is identified as redundant, wherein the label comprises a signature identifying the data segment, and wherein the receiving DPU extracts the data segment stored at the receiving DPU based on the received label; and
    transmitting the data segment to the receiving DPU, if the data segment is identified as non-redundant.

2. The method of claim 1, wherein the transmitting the label comprises:
    mapping an index onto the signature identifying the data segment; and
    transmitting the index as the label.

3. The method of claim 1, wherein the satisfying of the redundancy-suppressing admission policy comprises satisfying at least one of: the non-redundant data segment has been re-transmitted within a predefined time period, and the frequency of transmission of the non-redundant data segment equals a predefined frequency.

4. The method of claim 1, wherein the transmitting of the label of the redundant data segment comprises transmitting a first header comprising the label, and wherein the first header indicates that the data segment is redundant and is present in the data cache at a receiving DPU.

5. The method of claim 1, wherein the transmitting the non-redundant data segment comprises:
    comparing the signature identifying the non-redundant data segment with signatures stored in the signature cache at the transmitting DPU; and
    if the signature is present in the stored signatures and the redundancy-suppressing admission policy is satisfied, transmitting the non-redundant data segment with a second header comprising a label identifying the non-redundant data segment, wherein the second header indicates that the non-redundant data segment has satisfied the redundancy-suppressing admission policy.

6. The method of claim 1, wherein the transmitting the non-redundant data segment comprises:
    comparing the signature identifying the non-redundant data segment with signatures stored in the signature cache at the transmitting DPU; and
    if the signature is present in the stored signatures and the redundancy-suppressing admission policy is not satisfied,
    transmitting the non-redundant data segment; and
    updating information stored corresponding to the signature, wherein the information comprises at least one of the number of times the non-redundant data segment has been transmitted, the time when the non-redundant data segment was last transmitted, and the frequency of transmission of the non-redundant data segment, wherein the information is updated in the signature cache.

7. The method of claim 1, wherein the transmitting the non-redundant data segment comprises:
    comparing the signature identifying the non-redundant data segment with signatures stored in the signature cache at the transmitting DPU; and
    if the signature is not present in the stored signatures, transmitting the non-redundant data segment; and
    storing the signature in the signature cache.

8. The method of claim 1 further comprising:
    dividing data to be transmitted into a plurality of data segments; and
    assigning the signature to the data segment from the plurality of data segments, wherein the signature uniquely identifies the data segment, the assigning is performed for each data segment from the plurality of data segments.

9. The method of claim 8, wherein the dividing the data is performed by using a rolling checksum algorithm.

10. The method of claim 8, wherein the dividing the data comprises varying the size of the plurality of data segments, wherein the size is varied to improve redundancy suppression.

11. The method of claim 8, wherein the assigning the signature comprises calculating the signature that marks boundaries of the data segment.

12. The method of claim 8, wherein the signature is a hash function.

13. The method of claim 1 further comprising:
    tracking data segments that are transmitted from the transmitting DPU to a receiving DPU; and
    storing only labels that identify the data segments in a cache of the transmitting DPU.

14. The method of claim 1 further comprising:
    storing, as redundant data segments, data segments satisfying the redundancy-suppressing admission policy in the data cache of the transmitting DPU;
    transmitting from the transmitting DPU to a receiving DPU, the redundant data segments with the label indicating that the data satisfied the redundancy-suppressing admission policy; and storing the redundant data segments in a data cache of a receiving DPU.

15. A system for suppressing redundancy in data transmission over a network, the system comprising:
- means for storing redundant data segments and corresponding signatures in a data cache of a transmitting data processing unit (DPU);
- means for storing signatures identifying non-redundant data segments in a signature cache of the transmitting DPU, wherein the signature cache is separate from the data cache;
- means for identifying if data segment to be transmitted to a receiving DPU is redundant, wherein the data segment is redundant if the data segment is present in the data cache or if the data signature satisfies a redundancy-suppressing admission policy, wherein the data segment satisfies the redundancy-suppressing admission policy if the given data segment has been transmitted for a predefined maximum number of times;
- means for transmitting a label identifying the data segment to the receiving DPU while omitting the data segment from the transmitting, if the data segment is identified as redundant, wherein the label comprises a signature identifying the data segment, and wherein the receiving DPU extracts the data segment stored at the receiving DPU based on the received label; and
- means for transmitting the data segment to the receiving DPU, if the data segment is identified as non-redundant.

16. An apparatus for suppressing redundancy in data transmission over a network, the apparatus comprising:
- a processor for executing instructions; and
- a machine-readable storage medium including instructions executable by the processor for suppressing redundancy in data transmission over the network, the machine-readable medium comprising:
- one or more instructions for storing redundant data segments and corresponding signatures in a data cache of a transmitting data processing unit (DPU);
- storing signatures identifying non-redundant data segments in a signature cache of the transmitting DPU, wherein the signature cache is separate from the data cache;
- one or more instructions for identifying if a data segment to be transmitted to a receiving DPU is redundant, wherein the data segment is redundant if the data segment is present in the data cache or if the data signature satisfies a redundancy-suppressing admission policy, wherein the data segment satisfies the redundancy-suppressing admission policy if the given data segment has been transmitted for a predefined maximum number of times;
- one or more instructions for transmitting a label identifying the data segment to the receiving DPU while omitting the data segment from the transmitting, if the data segment is identified as redundant, wherein the label comprises a signature identifying the data segment, and wherein the receiving DPU extracts the data segment stored at the receiving DPU based on the received label; and
- one or more instructions for transmitting the data segment to the receiving DPU, if the data segment is identified as non-redundant.

* * * * *